United States Patent [19]
Youngs

[11] 4,034,163
[45] July 5, 1977

[54] APPARATUS FOR MECHANICALLY OPERATING PUSH BUTTONS

[75] Inventor: Wilbur R. Youngs, Dallas, Tex.

[73] Assignee: Zip-Call, Inc., Allen, Tex.

[22] Filed: Jan. 7, 1976

[21] Appl. No.: 647,218

[52] U.S. Cl. .......................................... 179/90 CS
[51] Int. Cl.² ........................................ H04M 1/48
[58] Field of Search ........ 179/90 CS, 90 B, 90 AD, 179/6.3 CC

[56] References Cited
UNITED STATES PATENTS

| | | | |
|---|---|---|---|
| 3,194,893 | 7/1965 | Auel | 179/90 CS |
| 3,634,631 | 1/1972 | Youngs | 179/90 CS |
| 3,723,664 | 3/1973 | Lundquist | 179/90 CS |
| 3,809,826 | 5/1974 | Rhodes | 179/90 CS |

*Primary Examiner*—William C. Cooper
*Assistant Examiner*—Gerald L. Brigance
*Attorney, Agent, or Firm*—Richards, Harris & Medlock

[57] ABSTRACT

An automatic system for operating the push buttons of a telephone keyboard includes a dialer frame with side members and a plurality of partitions forming spaced slots. The frame is adapted to overlay the push buttons and the slots formed by the partitions. The side members extend normal to the plane of the push button array and parallel to the length of the rows. Actuators are pivotally mounted in the slots, one in each slot, with each actuator having a bottom foot to contact one of the push buttons. Each actuator also has an upwardly facing hook. A perforated card moved along the top of the frame in the direction of the length of the slots engages at its perforations the actuator hooks. The hooks move to rotate the actuators for depression of the underlying push button, while releasing the hook from the perforations. The dialer frame is also provided with an array of manual keys substantially duplicating the array of the push button telephone to which the device is to be applied. Thus, there is provided a device for selectively actuating keys arrayed in columns and rows by manual use of a perforated card with the device in place.

10 Claims, 14 Drawing Figures

APPARATUS FOR MECHANICALLY OPERATING PUSH BUTTONS

This invention relates to automatic actuation of keys in a keyboard such as on a push button telephone, and more particularly to an improved linkage system for dialing by the simple insertion and withdrawal of a perforated card.

Automatic systems for dialing of push button telephones heretofore have been known. Actuators responsive to coded light pulses generated in response to movement of a prepunched card past a sensor system have been provided. One such system is described in U.S. Pat. No. 3,194,893.

In prior U.S. Pat. No. 3,634,631 a system which is totally mechanical in operation and thus not requiring any additional power input has been illustrated and described.

The present invention represents an improvement over such mechanically actuated systems. Specifically, the present invention is directed to a system in which the buttons of a push button set are sequentially depressed in dependence upon the coding of holes punched into a plastic or other type card inserted into and out of an actuating card way. Further, the present invention is directed to a system in which key actuators are so arranged that the coding on a given card has holes logically arrayed on a spatial basis in direct correlation with respect to the sequence of digits in the number to be dialed.

More particularly, in accordance with the present invention, improvements are provided in a system for mechanically operating selected keys arranged in columns and rows along a surface. A frame overlays the keys, and includes a plurality of partitions extending to a card way. The partitions define slots which are normal to the plane of the array and extend in the direction of row length. The slots are provided in number equal to the number of keys in each column. A key actuator is pivotally mounted in each slot. Each actuator has a bottom foot in contact with one of the keys and a hook directed away from the keys extending into the card way. A card is structured to cooperate with the hooks to rotate the actuators and thereby depress the keys adjacent to the actuator feet. In a more specific aspect, each actuator has a hook forming part of a foot structure which is pivotally secured in each slot at a point adjacent the plane of the keys. A resilient cantilever beam anchored to the foot structure at one end thereof carries the hook at the other end thereof.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
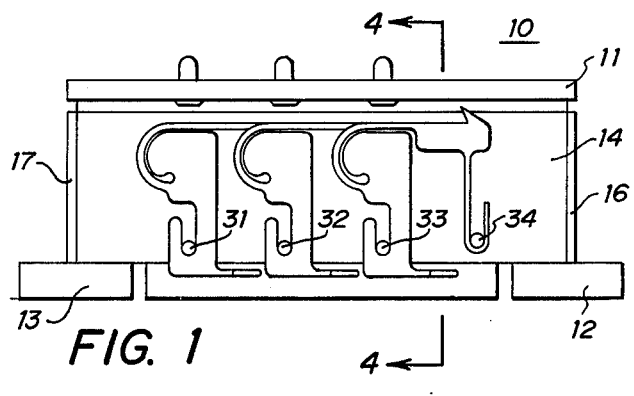
FIG. 1 is a side view of an embodiment of the invention.
Figure 3:
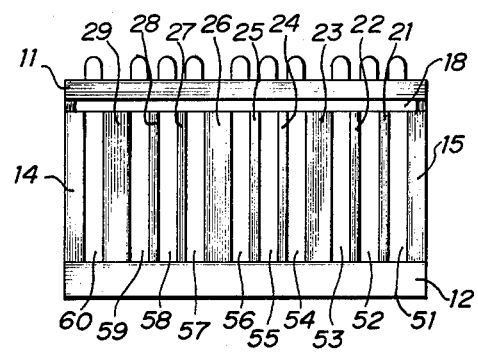
FIG. 3 is an end view of the unit of FIG. 1.
Figure 2:
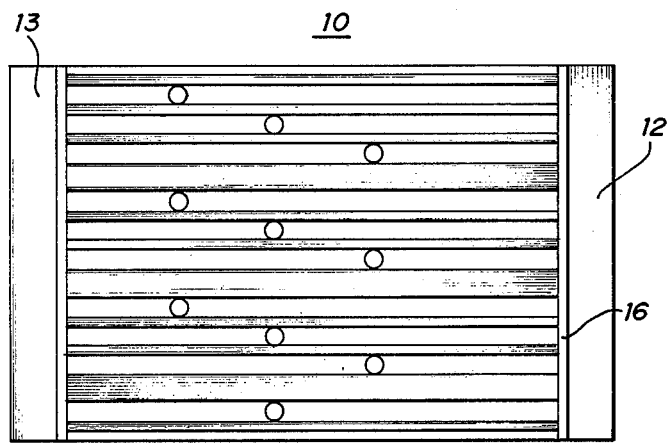
FIG. 2 is a top view of the unit of FIG. 1.

Referring now to FIGS. 1-4, a dialer frame 10 is of rectangular polyhedron shape having a top plate 11 and bottom feet 12 and 13. Side members 14 and 15 rest on feet 12 and 13 and support top plate 11. End plates 16 and 17 also rest on feet 12 and 13 and extend upwardly such that the upper edges define a plane which is spaced below the bottom of the top plate 11 thereby to form a card way 18. A punched card is to be inserted adjacent end plate 16 into the way 18.

A plurality of partitions 21–29 along with the side plates 14 and 15 form 10 slots 51–60. Actuating members A0–A9 are mounted in slots 51–60, respectively.

Actuating members A1, A4 and A7 are pivoted on a pin 31. Actuating members A2, A5, A8 and A0 are pivoted on a pin 32. Actuating members A3, A6 and A9 are pivoted on a pin 33.

Figure 5:
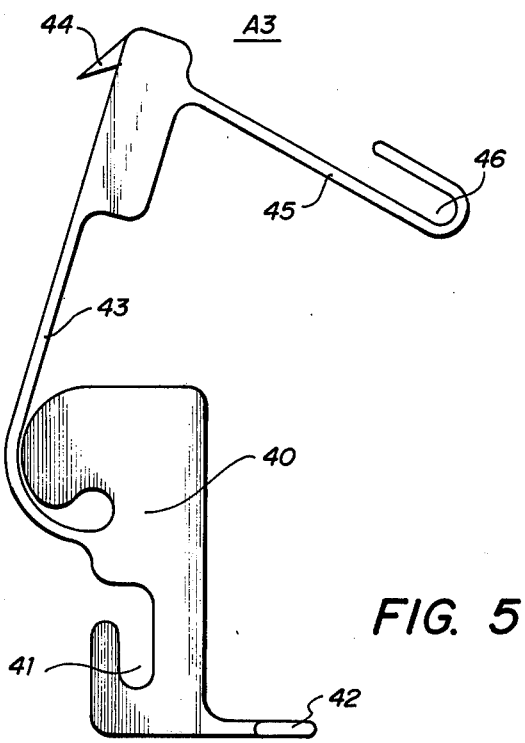
FIG. 5 is a side view of an actuating member in an unstressed state.
Figure 6:
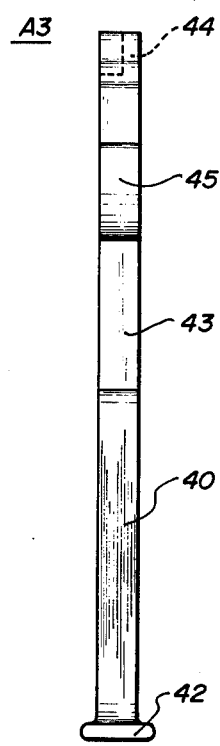
FIG. 6 is an end view of the foot portion of the actuating member of FIG. 5.
Figure 7:
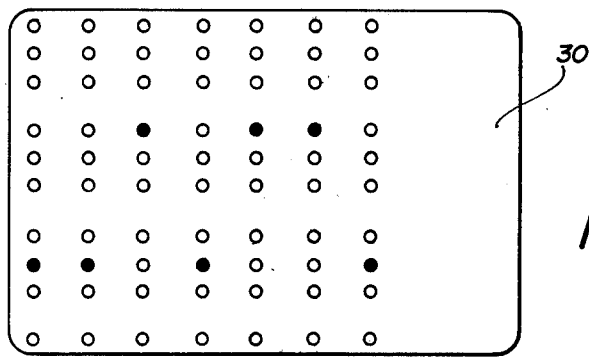
FIG. 7 illustrates a coded card.
Figure 8:
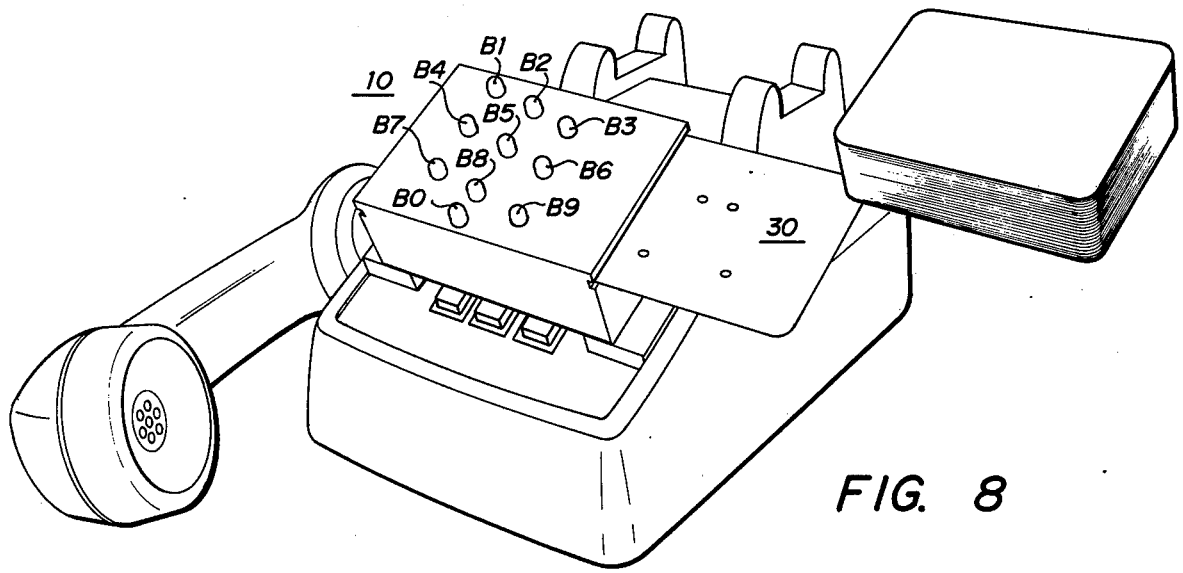
FIG. 8 illustrates operation of the system utilizing a deck of coded cards.

FIG. 5 illustrates the form, in an unstressed state, of an actuating member A3. Member A3 includes a flat foot or pawl plate 40 having a slot 41 therethrough to receive pin 33. The pawl plate generally is rectangular and has a foot 42 which extends down below the bottom edges of the partitions 21–29. A flexible beam 43 is rooted cantilever fashion in the upper left portion of the pawl plate 40. Beam 43 is resilient so that when flexed towards the pawl plate, it will conform to the shape of the upper curved surface of the pawl plate.

The free end of beam 43 is provided with a sharp upstanding hook 44. A tie down spring 45 having a long hook 46 at the lower end thereof is adapted to be secured to pin 34. The spring 45 is rooted cantilever fashion in the portion of the beam 43 on the side thereof opposite hook 44. With hook 46 engaging pin 34 and pin 33 extending through slot 41, the beam 43 forces the hook 44 upward to engage the under surface of the top plate 11. A card which is inserted into the way 18 will cause the hook 44 to be slightly depressed, i.e., the distance equal to the thickness of the card 30. However, when card 30 is withdrawn from way 18, any hole aligned with hook 44 will pull the hook 44 to the right. As it does so, the spring 45 rotates about the pin 34 thereby causing the hook 44 to track downward as it moves with card 30. The downward component of motion pulls the hook 44 out of any hole in card 30 in which it is engaged.

As hook 44 moves with card 30, a pawl plate 40 rotates clockwise, thus causing foot 42 to engage the top of a push button and to actuate the same.

Actuating members A3, A6 and A9 will have the same relative proportions as shown in FIG. 5. Actuating members A1, A4 and A7 will be of the same general relationship except the length of the beam will be longer by an amount equal to the distance between pins 33 and 31. Similarly, actuating members A2, A5, A8 and A0 will have the same general configuration as member A3 of FIG. 5 except that the beam 43 will be longer by an amount equal to the distance between pins 33 and 32. In such an arrangement, there are ten actuating members in the frame 10. Each has a hook such as the hook 44. The hooks normally are at rest in alignment, i.e., positioned on a common transverse base line 50, FIG. 4. It is at this line that the card engages the hooks in accordance with holes punched in the card.

A set of buttons B0–B9 extend upward through holes in the top plate 11. Feet on buttons B0–B9 on the underside of top plate 11 serve to force the card 30 down against the bottom of the way 18, i.e., against the top edges of partitions 21–29. Buttons B0–B9 are positioned as to engage the actuating members A0–A9 when manual operation is desired.

Figure 4:
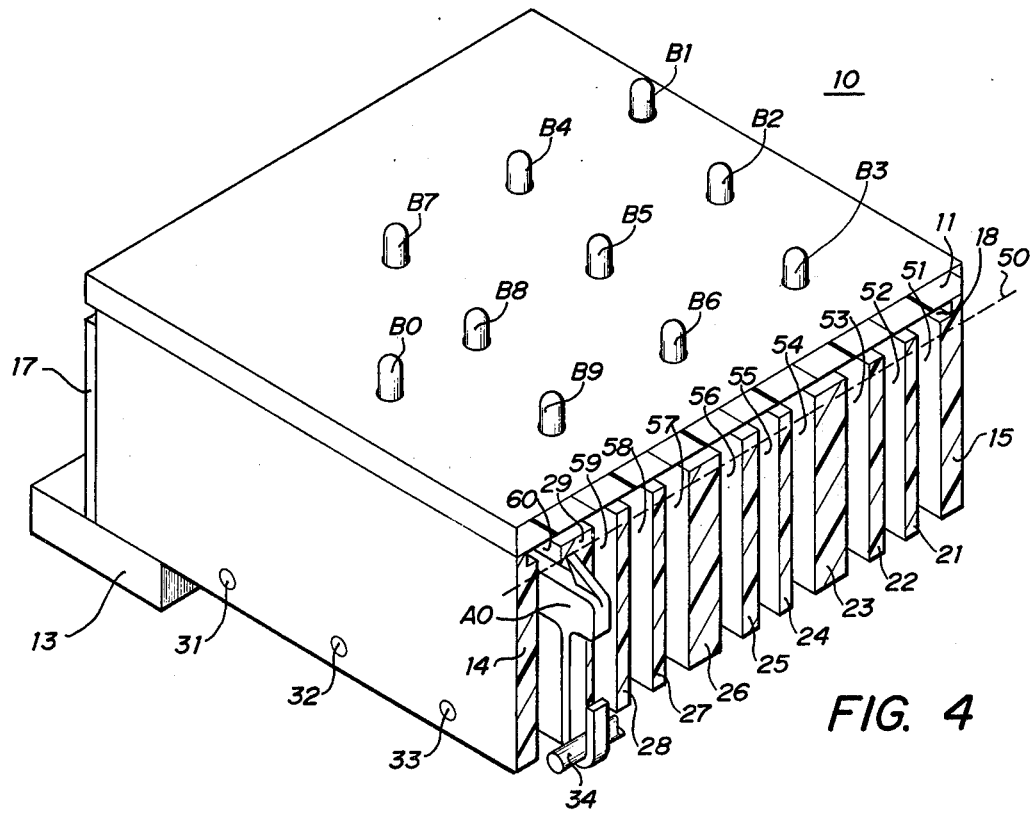
FIG. 4 is an isometric view of the system of FIGS. 1-3 partially broken away.

The embodiment of the invention illustrated in FIGS. 1–8 involves the use of actuating members of the type shown in FIG. 5 and with the manual buttons on a staggered relationship as illustrated in FIG. 4.

A preferred form of the invention is illustrated in FIGS. 9–13 in which a camming actuator is employed, and in which the manual keys have the same distribution, appearance and array geometry as the telephone key set over which the automatic dialer is placed.

Figure 9:
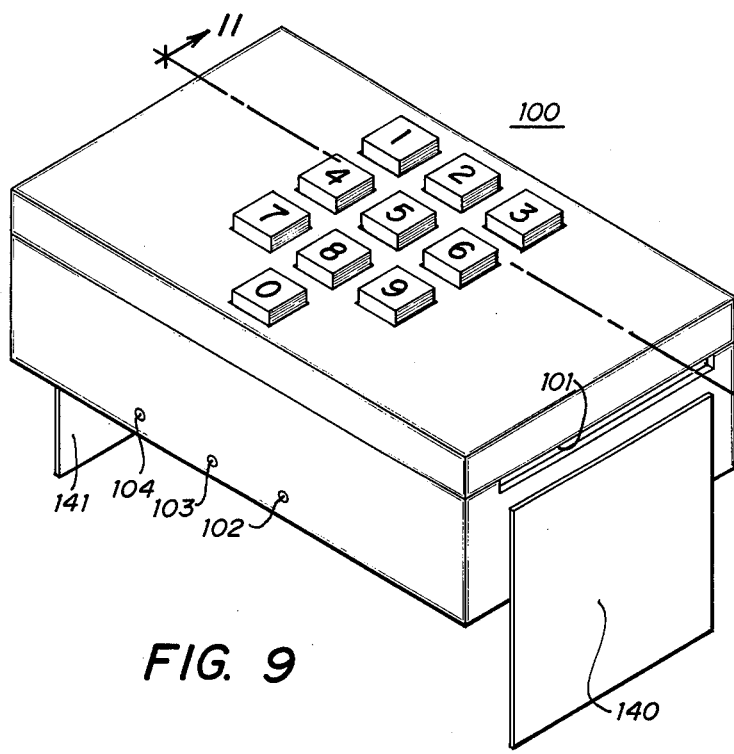
FIG. 9 is an isometric view of a preferred embodiment of the invention.

More particularly, as shown in FIG. 9 the dialer unit 100 is provided with an array of manual keys 0–9 substantially duplicating the array on the push button telephone to which the device is to be applied. It is provided with a card way 101. The actuators are pivoted on transverse pins 102, 103 and 104, as will later be described. The dialer unit 100 is also provided with a fixed camming plate 105 and a retainer plate 106.

Figure 10:
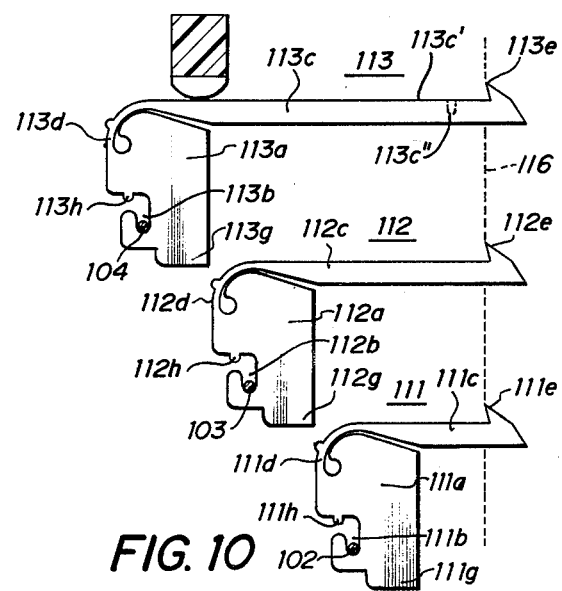
FIG. 10 illustrates three actuating members used in the embodiment of FIG. 9.

In FIG. 10 the preferred form of the actuating members is shown. There are three different sizes of actuating members 111, 112 and 113. They are similar one to the other, differing only in the length of the hook arm. For example, the actuator 111 includes a flat pawl plate or foot 111a having a slot 111b to receive pin 102. A hook arm 111c is integrally formed with the pawl plate 111a and connected thereto by a thin hinge section 111d. The hook arm has an upwardly directed hook 111e. A foot 111g depends downwardly from pawl plate 111a.

In a similar manner, the actuating member 112 has a pawl plate 112a from which depends a foot 112g and to which is connected the hook arm 112c. The hook arm 112c is longer than hook arm 111c by an amount equal to the distance between the pivot pins 102 and 103 as shown in FIG. 9.

In a similar manner, the actuator 113 includes a pawl plate 113a with a depending foot 113g and a hook arm 113c. Arm 113c is longer than arm 112c by an amount equal to the distance between the pivot pins 103 and 104 as shown in FIG. 9.

Figure 11:
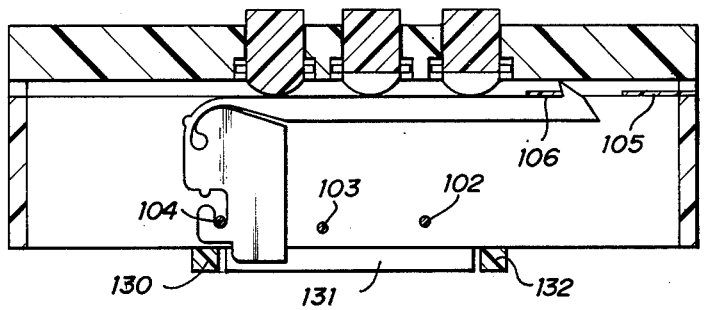
FIG. 11 is a sectional view taken along lines 11—11 of FIG. 9.

As shown in FIG. 11, retainer plate 106 extends transversely across the top of the slots in the dialer unit 100 parallel to the pivot pins 102–104. The A fixed camming plate 105 similarly is mounted to extend across the tops of the slots at the entrance to card way 101. A perforated card 121 is fully inserted into card way 101 and then withdrawn in the direction 120 to engage the hooks 111e, 112e and 113e, depending upon the perforations in the card. The pawl plates 111a, 112a and 113a thereby may be rotated in a clockwise direction, and the feet 111g, 112g and 113g may be moved downward to depress selected keys in the array of the original telephone set. As this action takes place, the hooks are withdrawn from the perforations in the card by movement of the hook surfaces along the edge of plate 105. Retainer plate 106 bears against the upper edges of arms 111c, 112c and 113c and against the working edge of the hooks 111e, 112e and 113e.

Figure 12:
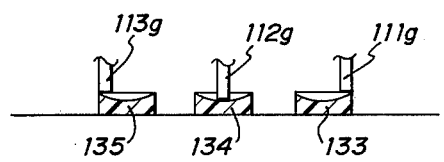
FIG. 12 illustrates the contact between the feet of the actuators of FIG. 10 and the underlying keys.

As illustrated in FIG. 12, foot 111g engages key 133 of the telephone key array along the upper edge thereof, foot 112g engages key 134 in the center of a surface depression, and foot 113g engages key 135 on the lower edge. Because of the slight depression in the key 134 at the point of contact with the foot 112g, the pin 103 for the actuators represented by actuator 112 is slightly lower than the pivot pins 102 and 104. Alternatively, the pins may be at the same level if the foot 112g is made longer than foot 111g and foot 113g.

Base bars such as bars 130 and 131 are mounted on the bottom of the unit 100. They are adapted to fit between the keys of the telephone set array to maintain the dialer in proper position. The dialer is then secured to the telephone set by adhesives, such as the adhesive strips 140 and 141 shown in FIG. 9. After installation on a telephone set, the user merely inserts card 121 into the way 101 until it is fully inserted and then withdraws it. As this is done, perforations in the card selectively engage the hooks 111e, 112e and 113e, there being ten such hooks in the unit. This causes the feet 111g, 112g and 113g to move downward depressing the underlying keys.

It will be noted that the actuators 111, 112 and 113 are each provided with a protrusion such as the protrusion 111h which serves to normally retain the actuator on the pivot pin 102. The resilience of the extension of the pawl plate 111a opposite the protrusion 111h permits the pawl plate to be either mounted on the pin or removed therefrom with the application of force. This structure thus assures the desired operation. In one embodiment of the system, the pivot pins 102–104 were 3/32 inch in diameter. The passageway between the protrusion 111h and the opposing surface was 0.015 inch smaller than the pin diameter.

As indicated in FIG. 10, the hooks 111e, 112e and 113e are upwardly directed and upwardly biased by the spring action of the thin sections 111d, 112d and 113d. They are normally at rest along a common base line represented by the dotted line 116. The coding of the card thus can be simplified as above explained in connection with FIGS. 1–8, and a device for selectively actuating keys arrayed in columns and rows by the use of a perforated card may be provided in accordance with the invention. The dialer comprises a frame adapted to overlay the keys with a plurality of partitions defining slots equal in number to the number of keys. The slots extend normal to the plane of the array and parallel to the length of the rows. Actuators are pivotally mounted in the slots, one in each slot, with each actuator having a bottom foot to contact one of the keys. Each actuator also has an upfacing and upwardly urged hook. A perforated card moved along the top of the frame in the direction of the length of the slots engages the hooks at its perforates, and moves the hooks to rotate the actuators for depression of the underlying keys. As the card movement continues, the hooks are disengaged from the card perforations.

In the embodiments shown, the thickness of the pawl plates was 0.09375 inch with 0.015 inch total clearance, thus requiring slot width of 0.109 inch. This provided accurate positioning of the hooks and yet prevented frictional forces from hampering the operation.

Figure 13:
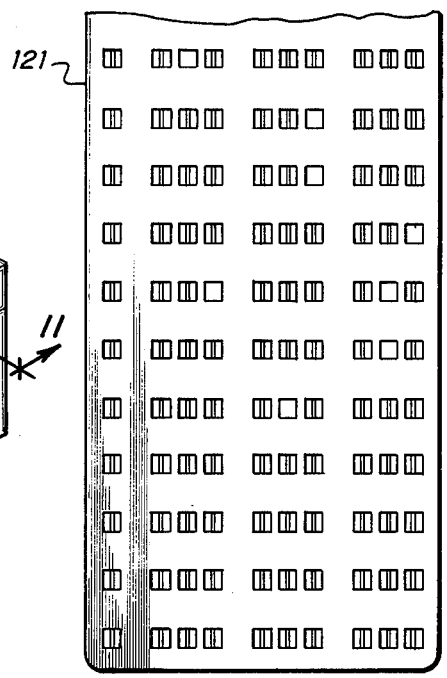
FIG. 13 illustrates a preferred form of coding card.
Figure 14:
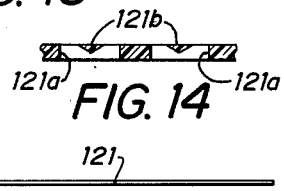
FIG. 14 is a partial sectional view of the card of FIG. 13.

The cards 121 as illustrated in FIGS. 13 and 14 are preferred for use in the system. Preferably they are 0.030 inch thick and 2.385 inches wide and 5.625 inches long. The holes 121a are arrayed in FIG. 13 as a 10 by 11 set. Holes 121a are square with a 0.109 inch by 0.109 inch dimension. Each hole 121a is formed with a knockout bar 121b which can be readily removed to encode the card. Bar 121b is of a triangular cross section, and extends parallel to the long dimension of card 121 and to a height less than the thickness of card 121. The base of the triangular bar is flush with the side of card 121 which faces the hooks 111e, 112e and 113e.

In FIG. 11, the retainer plate 106 serves to position the upper edge of the hook bodies. The fixed camming plate 105 is so positioned that the hook will move downwardly as it is propelled by withdrawal of the card shown in FIG. 13. It will now be understood that release of the points of the hooks 111e, 112e and 113e from perforations in the card 121 may be accomplished without the use of camming plate 105. More particularly, arms such as arm 113c, FIG. 10, may be provided with a transverse slot extending from the upper edge 113c' towards the bottom edge thereof. The arm 113c thereby may undergo localized bending as the camming plate 113a fully depresses an adjacent key, and the hook portion 113e may have a forward rather than a backward slope to permit the release of the hook from the perforation with which it is engaged. Such a slot 113c'' has been indicated in FIG. 10. The embodiment which employs camming plate 105, however, is preferred because release is effected with shorter hook stroke than the embodiment employing slot 113c''.

Having described the invention in connection with certain specific embodiments thereof, it is to be understood that further modifications may now suggest themselves to those skilled in the art and it is intended to cover such modifications as fall within the scope of the appended claims.

What is claimed is:

1. A device for selectively actuating keys in an array of columns and rows by use of a perforated card comprising:
    a. a frame adapted to overlay said keys,
    b. partition means in said frame defining slots in number equal to the number of said keys which slots extend normal to the plane of said array and parallel to the length of said rows, and
    c. actuators each having an upfacing upwardly urged hook mounted to operate such that there is one in each of said slots, each actuator being pivotally mounted and having a bottom foot to contact one of said keys,
    whereby a perforated card moved along the top of said frame in the direction of the length of said slots with perforations therein selectively engages and moves said hooks to rotate said actuators for depression of said keys.

2. The combination of claim 1 in which means are provided to move said hook away from the top of said frame to disengage said hooks from said perforations as said keys are depressed.

3. The combination set forth in claim 2 in which a camming plate at the top of said frame forces said hooks downward as they move with said card.

4. A device for mechanically operating selected keys arrayed in columns and rows along a surface comprising:
    a. a frame adapted to overlay said keys with the bottom of said frame at about the plane of the top of said keys,
    b. structure in said frame defining slots normal to the plane of said array and extending the length of each row in number equal to the number of said keys,
    c. an actuator pivotally mounted adjacent to each one of said keys and each actuator having an engageable member at the upper surface of said frame which is normally positioned along a transverse base line, one actuator in each of said slots, each said actuator having a bottom foot in contact with one of said keys, and
    d. a card structured to cooperate with said engageable member to move said engageable member away from said base line in the direction of the length of said rows to rotate said actuator to depress the adjacent key by said foot.

5. The combination set forth in Claim 4 in which each said actuator has a pawl plate with an extending foot and an integral beam spring which extends parallel to the plane of said keys and is urged away from said plane with an upstanding hook directed away from said plane and shaft means extending through said frame pivotally mounting said pawl plate.

6. The combination set forth in claim 5 in which a transverse cam plate at the top of said partitions spaced from the forward end forces said hook member downward under movement by said card.

7. The combination set forth in claim 5 in which a link extends from a point on said beam spring adjacent said engageable member to a point therebelow to tether said engageable member and force it downward as it is moved by said card.

8. In a device for mechanically operating selected keys arrayed in columns and rows along a surface where a frame overlays said keys with structure in said frame extending to a card way above said keys to define slots normal to the plane of said array in number equal to the number of keys in said array, the combination comprising:
    a. actuators each including a hook directed away from said keys and urged upward into said way in each said slot and a pawl plate connected to each of said hooks, pivotally mounted with a bottom actuator foot in contact with one of said keys, and
    b. a card perforated to engage said hooks selectively to rotate said actuators to depress the keys contacted by the respective actuator feet while moving said hooks lengthwise of said slots.

9. The combination set forth in claim 8 in which each said actuator includes said bottom foot and a second member spaced therefrom to move said foot downward in said frame as said hook moves along its slot.

10. The combination set forth in claim 8 in which said actuator includes a resilient cantilevered beam rooted at one end in said pawl plate and carries said hook at the other end thereof.

* * * * *